Figure 1:
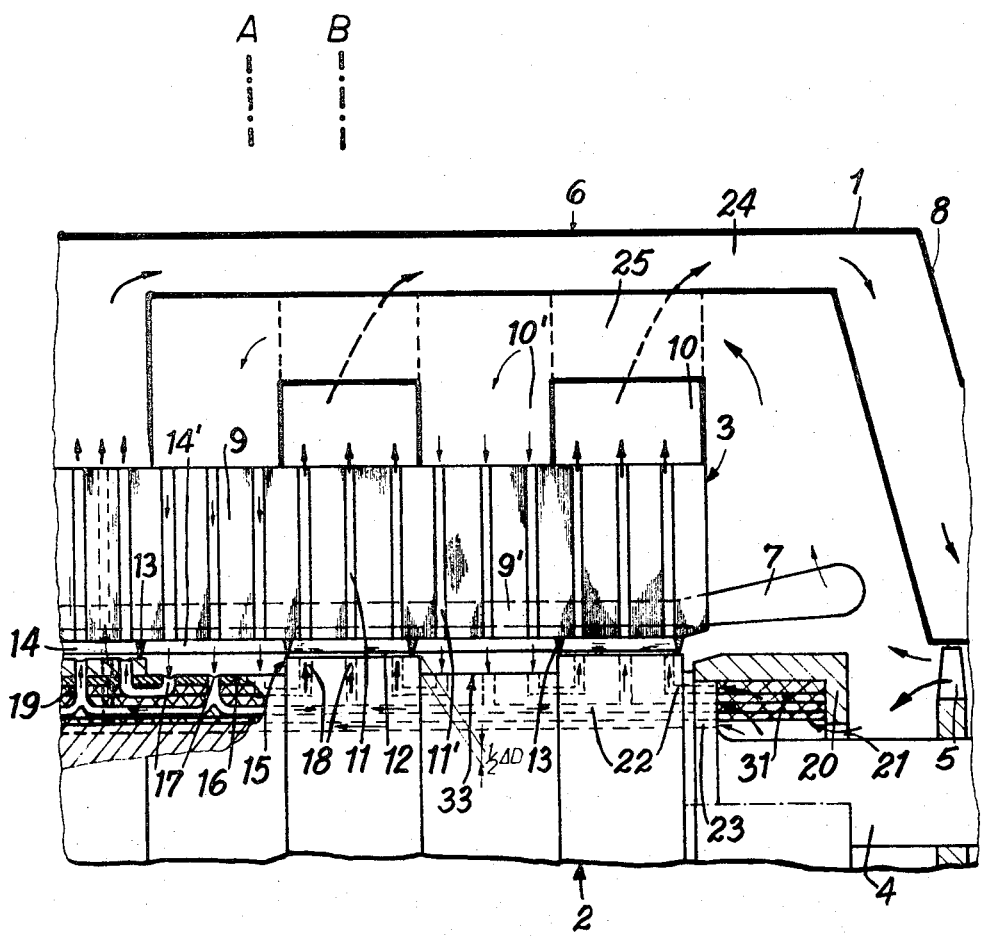

United States Patent [19]
Baer et al.

[11] 3,809,934
[45] May 7, 1974

[54] GAS-COOLED ELECTRICAL GENERATOR

[75] Inventors: Jürgen Baer, Magenwil; Dieter Sommer, Untersiggenthal; Ernst Toplak, Lupfig, all of Switzerland

[73] Assignee: Brown Boveri & Company Limited, Baden, Switzerland

[22] Filed: Apr. 20, 1973

[21] Appl. No.: 353,081

[30] Foreign Application Priority Data
May 9, 1972 Switzerland................... 6810/72

[52] U.S. Cl.................................. 310/53, 310/62
[51] Int. Cl. ............................................. H02k 9/00
[58] Field of Search............ 310/52, 53, 55, 54, 56, 310/57, 58, 59, 60, 61, 62, 63, 64, 65, 214, 215, 216, 217, 218

[56] References Cited
UNITED STATES PATENTS

| | | | |
|---|---|---|---|
| 3,348,081 | 10/1967 | Willyoung | 310/55 |
| 3,408,516 | 10/1968 | Kudlacik | 310/214 |
| 3,413,499 | 11/1968 | Barton | 310/58 |
| 3,428,838 | 2/1969 | Carson | 310/57 |
| 3,441,758 | 4/1969 | Albright | 310/58 |

Primary Examiner—R. Skudy
Attorney, Agent, or Firm—Pierce, Scheffler & Parker

[57] ABSTRACT

A gas-cooled dynamo-electric machine such as a turbo-driven generator includes cooling channels extending radially through the stator to the gap between it and the rotor, and also cooling channels extending both axially and radially through the rotor, for the circulation of a cooling gas. The rotor is stepped longitudinally into a series of successive stages alternating in diameter thereby to establish corresponding zones alternating in gap width. The radially inner ends of those cooling channels in the stator component carrying gas radially inward and axially correlated with the zones having the larger gap width are provided with vanes profiled to effect a reduction in the impact losses at the gas entrance ends of the axially correlated radial channels in the rotor component, and the radially inner ends of those cooling channels in the stator component carrying gas radially outward and axially correlated with the zones having the smaller gap are provided with vanes profiled to recover the velocity energy of the cooling gas discharged into the gap from the radial channels in the rotor component functioning as the flow channels of a radial compressor.

6 Claims, 2 Drawing Figures

GAS-COOLED ELECTRICAL GENERATOR

This invention concerns a gas-cooled electrical machine of high capacity, in particular a turbo-generator, consisting of a stator with radial bores and a rotor provided with radial and axial channels through which the gaseous cooling medium flows.

Electrical machines are known, the cooling of which is done by means of ventilators, i.e., fans arranged on the rotor, and also by blowers, whereby the cooling medium is brought into the rotor through axial channels and from radial openings of these led to the air-gap and then in radial slits along the rotor which cross into the housing cylinder. From here the heated cooling medium flows over a cooler and is sent back to the ventilator to flow again in the described closed circuit from there onwards.

Another well-known form of construction of electrical machines arranges the cooling medium to be led to the stator in the form of a counter-current. In some of the channels the flow is radially outwards and in the other radially inwards whereby the reversal of direction takes place in the air-gap region without the cooling medium flowing out of the channels of the rotor coming in contact with the reversing or radially inwards direction of the cooling medium flow. For this purpose the radial cooling channels of the stator are covered with a plate which gives passage to the in-flow of the hot gases spun out by the rotor, and which together with the gas heated by the stator is brought to the cooler through the channels directed radially outwards.

The capacity limit of electrical machines mainly depends on adequate cooling of the machine, and the self-consumption of power for operating the blower appears as a loss in efficiency.

The above-mentioned forms of construction, in the first case, have a low cooling capacity due to the flow losses. This, however, results in the capacity limit output of the machine also remaining at a low value. In the second case, in spite of the increased expense and the complicated system, the cooling performance remains below expectations, since the hot gases of the rotor arrive at the air-gap without being cooled and are thereafter taken out with the heated gases of the stator. Due to this, one has unequally heated spots in the rotor and the stator which lead to uneven stressing of the machine and in addition again negatively influence the capacity limit.

It is, therefore, the object of the present invention to avoid the mentioned draw-backs whereby the ventilation losses in the air-gap as well as the self-consumption for the ventilators or blowers have been reduced.

The solution of the problem through this invention consists in that the radial bores of the stator in the region of the air-gap between the stator and the rotor are provided with deflecting vanes, so formed that those vanes for the flow in the radially outward direction have a profile designed to recover the velocity energy while those vanes for the flow in the radially inward direction have such a profile that the impact losses on the corresponding radial entrances of the cooling channels arranged on the rotor are reduced. In addition, between individual zones of the machine, which differ in the direction of flow, contact-free ring seals are provided at the rotor or the stator, whereby corresponding to the sections of the directions of flow, the rotor periphery is stepped in diameter into stages in such a way that the rotor cooling channels, which run first axially and then radially, are formed up to the exit as flow channels of a radial compressor. The advantages of this arrangement within the closed cooling circuit of the machine are effective in various respects. On one hand, the flow losses are reduced due to the deflection vanes and the required machine capacity for operating the ventilators is smaller since a lower pressure drop occurs due to the conversion of the appreciable velocity energy of the cooling medium into pressure energy in the channels. In order to further aid this action, contact-free ring seals are provided between the individual flow sections and which prevent a re-circulation between the individual flow directions.

An additional advantage can be seen in that due to their construction as deflecting vanes, the slot keys for the stator winding are strengthened, i.e., the withstanding strength requirements can be appreciably reduced. Moreover, according to a special development of the invention the deflecting vanes can be made as continuous members extending longitudinally of the stator whereby the deflecting vanes can advantageously be formed to function also as slot keys, at least in the region of the cooling channels.

The slot keys can, for example, be made of synthetic material so that due to the simpler manufacture and treatment methods, a simplification in the construction as well as the maintenance of the machine is obtained. Another advantage is obtained by the construction of the rotor with hollow conductors, as the cooling of the rotor is thereby additionally improved without the external cooling of the same hollow conductor being loaded by it. Due to the wedges arranged at the casing for holding the hollow conductors in the grooves of the rotor, a flow channel for the cooling medium is formed by the spaces between the wedges. For this it is practical to have a cooling medium brought to the outside which is identical as or mixable with the one inside the hollow conductors.

It is also possible to have cooling gas outside and cooling liquid inside.

The advantage of the circumferential staging provided longitudinally along the rotor surface, and from which there is derived a pressure differential utilized for advancing the gaseous cooling medium, is obtained by successive differences in rotor diameter.

This action is augmented by appropriate formation of the flow channels in the rotor. The cooling of the electrical machine is thus further improved and the expenditure for it reduced.

Figure 2:
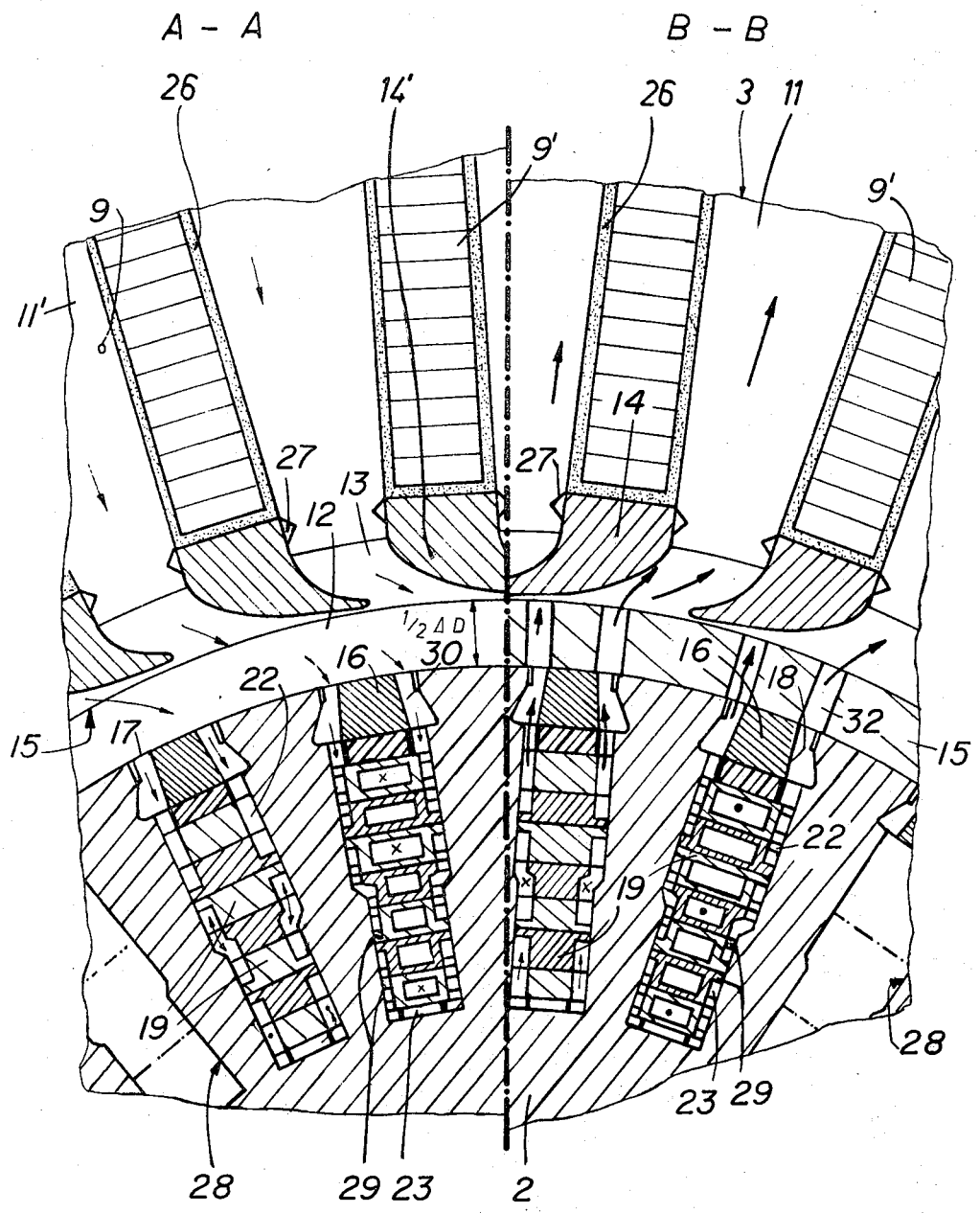

A preferred embodiment of the invention will now be explained in detail in conjunction with the accompanying drawings, wherein:

FIG. 1 is a somewhat schematic representation of a longitudinal section through the machine, and FIG. 2 is a partial transverse section through the rotor and stator elements in the vicinity of the air gap therebetween, the part to the left of the dot-dash vertical line being taken along line A—A in FIG. 1, and the part to the right of this line being taken along line B—B of FIG. 1.

The arrows in the figures show the flow action and the path of the cooling medium. Different thicknesses of the arrows refer to the partial currents, separated from one another, inside the closed circuit.

In FIG. 1, the schematic representation of a turbo-generator has been reproduced where parts not essential to an understanding of the invention, such as the manner of supporting the rotor 2 on bearings, or the support for the stator coil end 7 on the housing, have been omitted for simplicity.

The stator part of the turbo-generator is mainly formed of the housing 1 together with diffusion chambers 10 and 10' for cooling gas and the bundles of laminations of the stator iron 9. The housing 1 can be composed of a cylindrical jacket 6 and end closures 8. The suction openings for cooling gas are provided in the end cover plate 8.

Bores 11 and 11' extending in the radial direction are provided in the stator iron 9. They run from air gap 12 between the rotor 2 and stator iron 9 to the exit points in the diffusion chambers 10 and 10'.

The rotor 2 consists of a rotor bundle 33 and the shaft 4 on which are mounted one or more impellers 5 for the cooling gas. The rotor bundle 33 consists of the rotor iron and the electrical conductors 19. The conductors 19 are brought together at the ends and bound to the shaft 4 by means of a cap ring 20. The rotor bundle 33 is peripherally stepped into several stages 15 of different diameters and is transversed by axial cooling channels 22 and 23 whose entrances at the rotor end are impinged upon by the partial currents of the impeller 5. The radial entrances 17 and the exits 18 open into the axial channels 22 and 23 and form the connection between the cooling channels 22 and 23 and the air gap 12.

On the internal circumference of the stator 3 sets of deflecting vanes 14 and 14' are provided which penetrate into the gap 12, and which are continuous in the longitudinal direction of the stator. Contact-free ring seals 13 are provided on these in the region of the stages 15 of the rotor 2 in the radial plane and along the circumference. Thereby the gap 12 is divided into adjacent zones of different width (radially) which together with the diffusion chambers 10 and 10' form flutes for the passage of gas in opposite flow directions.

The differentiation between radially inwards and radially outwards directed parts is shown by the addition of a prime to its reference symbol.

The cooling channels 22 and 23 are arranged, in accordance with aerodynamic considerations, at the opening points to the entrances 17 and the exits 18 so that in the case of deflection, separation, or coming together, of gas currents in the cooling channels no additional losses should occur. The two sets of deflecting vanes 14 and 14' are formed in the same way whereby well-known theorems or formulations from the appropriate literature have to be considered.

On rotor 2, the difference $\Delta D$, in diameters, between the axial cooling channel 23 and the exit 18 on the peripheral stage 15 is utilized for pressure increase and also the energy given to the cooling gas due to the rotational velocity in the gap 12 is drawn upon for pressure recovery in the closed circuit. After flowing through the bores 11, the cooling gas reaches the chamber 10 and is brought back to the suction opening in the end closure 8 by means of a manifold 24 which runs through a cooler not shown in the figure. The impeller 5 on the rotor shaft accelerates and compresses the cooling gas, which after being discharged from it is divided into two partial currents. The first part goes over the stator coil end 7 and a duct 25 to the diffusion chambers 10' from where the cooling gas enters the gap 12 between the rotor 2 and the stator 3 through the bores 11'. At the opening of the bores 11' to the gap 12, deflecting vanes 14' are provided. After the deflection from tangential direction in gap 12 to radial direction in the entrance 17, and after flowing axially in the cooling channel 23 and thereafter again in radial direction from cooling channel 23 to exit 18, the cooling gas of the partial current reaches again in the gap 12, in effect in one of the peripherial stages 15 and passes over the deflecting vane 14 radially outward in the radial bores 11 of the stator 3 to chamber 10. With that the cycle of the partial current is closed.

The second partial current after leaving the impeller 5 enters through the openings 21 in cap ring 20 into the cooling channels 22, 23 from where a portion deflects towards the rotor coil heads 31. This portion is then introduced into the boundary area of the axial cooling channel 22 whereby this also is connected with the cycle described before.

The rest of the cooling gas flows over the cooling channel 23 to the middle part of the rotor bundle 33 and over the already described facilities in the cooling channel and the exits 18 over the gap 12 to the radial bores 11 in the stator iron 9, after which the cooling gas is led to the cooler through the diffuser chambers 10 and the manifold 24 and again to the suction openings of the impeller 5 in the end closure 8 of the jacket 6.

For a better overall view, FIG. 2 gives a sectional view of the machine, made through two displaced planes along the lines A—A and B—B in FIG. 1. For the same parts in both figures, corresponding symbols or numbers have been chosen.

The section in FIG. 2 shows the stator 3 whose bundle of laminations is provided with radial bores 11 and 11'. The stator winding 9' is fixed in the stator iron 9 by means of slot keys 27 and is covered with electrical insulating material 26.

The slot keys 27 are made out of one piece together with the deflecting vanes 14 and 14' whereby in the region of the bores 11 and 11' the keys themselves have been omitted in order not to disturb the flow. The remaining length of the slot keys 27 is extended radially inwards and formed into a deflecting vane 14 or 14'. On the borders of the zones of different flow directions in the gap 12, ring seals 13 have been provided which seal the stages 15 and the rotor bundle 33 against one another, in labyrinth-like contact-free manner. The stage 15 can be represented, in a simple manner, by a ring which is connected internally with the rotor bundle 33, e.g. by shrink fitting and has passages 32 for the cooling medium. The rotor 2, whose external circumference corresponds with the lip of the ring seal 13 has many such stages 15 and in addition is provided with axial grooves 28 distributed along the circumference. The conductors 19 are embedded into these which in the figure have been shown as being hollow. The conductors 19 have projections 29 on the side surfaces and which buttress the conductors 19 against the walls of the grooves 28. Thereby the formerly mentioned axial cooling channels 22 and 23 are formed on the side surfaces and through which the cooling gas flows. The direction of flow is shown by dot (.) or cross (x) but can be altered variously.

By forming the projections 29 as continuous lugs many axial cooling through channels can be formed in a simple manner, whereby bent lugs for aerodynamically good deflection of the medium through 90° or 180° are provided at the openings to the entrances 17 and the exits 18.

The grooves 28 are closed by means of slot keys 16 so that the conductors 19 in the groove 28 are held fixed in the radial direction. The slot keys 16 in the region of the entrances 17 and the exits 18 are provided with slits 30 through which the cooling medium enters the gap 12 or flows into the cooling channels 22 of the rotor 2.

The manner of working of the cooling system will now be explained more specifically.

A cold gas, for example air, passed over a cooler (not shown) is brought into the housing 1 by the impeller 5 and split up after leaving the impeller. A part of this gas flows over the coil end 7 of the stator 3 to the diffuser chambers 10 of the machine and from there over the cooling channels 11' radially inwards towards the air gap 12. The gas current is, on the one hand, deflected in the direction of the circumference by the deflecting vanes 14 and, on the other hand, accelerated in the rotational velocity. Thereby, not only the frictional losses in the air gap 12 are reduced but also an impactless entry in the rotor 2 is taken care of which also reduces pressure losses.

After renewed deflection of the air current in the rotor 2 or in the channel made up of the entry 17, the cooling channel 23 and the exit 18, this partial current is compressed as the stage 15 works as a radial compressor due to the differences Δ d in diameters on the rotor 2. The gas current comes out in the gap 12 and over the deflecting vanes 14 into the bores 11 of the stator 3. Hereafter the gas from the diffuser chamber 10 is collected in the manifold 24 and again sent over the cooler to the impeller 5.

The second partial current of the cooling gas enters the cooling channesl 22, 23 of the rotor through the openings 21 on the cap ring 20 where the gas flows around the conductor 19. At the same time the use of hollow conductors 19 permits these to be cooled internally in addition to externally and to join the cooling medium externally at a convenient point to come out into the air gap 12. A possible exit for the hollow conductors is shown in FIG. 2 in the left exit slot. The gas flowing through the cooling channel 22 is directed over the rotor coil end 31 and afterwards brought to the next exit 18 on the boundary of the stage 15. From this it comes out into the sealed gap 12 whereby again because of the available difference Δ D in diameter the cooling gas is compressed and the centrifugal acceleration utilized.

To aid this compression and to obtain impactless entry into the bores 11, the deflecting vanes 14 already mentioned are provided on the stator 3. These are shaped in such a way that pressure increase takes place. The basis for this is given by the knowledge that the velocity energy of the gas currents coming out of the rotor 2 into the gap 12 was fully lost due to the turbulence. Thereby a so-called self-promotion of the rotor 2 is obtained, i.e., per deflection and per stage 15 or per outlet group 18 a portion of the compression work of the impeller can be recovered and thus the pressure over the whole closed circuit kept almost uniform. From this the advantage is obtained that the impeller 5 does not have to overcome the total pressure drop of the closed circuit but is supported individually by the channels on the rotor 2 working as intermediate stages and the pressure recovery at the deflecting vanes 14 and the impactless entry and exit. An exact separation between the currents in the opposite directions is made possible by the ring seals 13 arranged on the stages 15 so that the cooling function is ensured at every point of the closed circuit. Moreover recirculation between zones in gap 12 is made impossible so that a local overheating of the conductor 19 and the rotor 2, as also the stator iron 9 and the stator winding 9', can be prevented with surety.

The invention is obviously not limited to the form of constructions described but can be modified widely. The deflecting vanes 14 can be made of plates or the staging 15 can be finished as a single piece together with the rotor bundle 33. The slots 30 in the slot keys 16 can be replaced by bores. These modifications do not bring about any change in function and point out the important features of the invention, which bring the advantage that large electrical machines can be loaded with the, until now, usual reduced ventilator capacity while the closed circuit itself causes a self-promotion.

I claim:

1. A gas-cooled dynamo-electric machine comprising a slotted stator component having a winding disposed in its slots, a slotted rotor component having a winding disposed in its slots and which is mounted for rotation within the stator component with a running radial gap therebetween, said stator component being provided with a system of internal distributed cooling channels extending radially from said gap to the periphery thereof, said rotor component being provided with a system of internal distributed cooling channels extending axially and thence radially to said gap, the periphery of said rotor component being stepped into a series of successive longitudinally extending stages alternating in diameter whereby to establish consecutive longitudinally extending zones alternating in gap width, means for circulating a cooling gas through the channels provided in said stator and rotor components such that flow paths are established radially outward from the rotor component at the zones having the smaller gap width and thence across said gap and radially outward through the channels in said stator component axially correlated therewith, other flow paths also being established radially inward through the channels of said stator component at the zones having the larger gap width and thence across said gap and radially inward through the channels in said rotor component axially correlated therewith, a first set of deflecting vanes disposed at the radially inner ends of those channels in the stator component axially correlated with the zones having the larger gap width and which are profiled to effect a reduction in the impact losses at the entrance ends of the axially correlated radial channels in said rotor component, and a second set of deflecting vanes disposed at the radially inner ends of those channels in the stator component axially correlated with the zones having the smaller gap and which are profiled to recover the velocity energy of the cooling gas discharged into the gap from the radial channels in said rotor component functioning as the flow channels of a radial compressor.

2. A gas-cooled dynamo-electric machine as defined in claim 1 wherein the rotor component is provided with an impeller thereon from the discharge side of which cooling gas is directed through axially extending cooling channels provided in said rotor component and is also directed through the cooling channels provided in said stator component for one zone in a radially inward direction across said gap into radial cooling channels provided in said rotor component of that zone, thence back through the gap in the adjacent zone and radially outward through the cooling channels provided in said stator component correlated to said adjacent zone and thence to the intake side of said impeller.

3. A gas-cooled dynamo-electric machine as defined in claim 1 wherein said first and second sets of deflecting vanes constitute integral parts of keys for fixing the stator windings in their respective slots.

4. A gas-cooled dynamo-electric machine as defined in claim 1 wherein said first and second sets of deflecting vanes extend into said gap between said stator and rotor components.

5. A gas-cooled dynamo-electric machine as defined in claim 1 wherein said axially and radially extending cooling channels in said rotor component are established in the slots containing the rotor winding.

6. A gas-cooled dynamo-electric machine as defined in claim 1 wherein the larger diameter zones of said rotor component are established by labyrinth-like contact-free sealing rings.

* * * * *